United States Patent
Nobayashi

(10) Patent No.: US 9,451,216 B2
(45) Date of Patent: Sep. 20, 2016

(54) DISTANCE CALCULATING APPARATUS, IMAGE PICK-UP APPARATUS USING THE SAME, DISTANCE CALCULATING METHOD, PROGRAM FOR REALIZING DISTANCE CALCULATION, AND STORAGE MEDIUM HAVING THE PROGRAM STORED THEREON

(71) Applicant: CANON KABUSHIKI KAISHA, Tokyo (JP)

(72) Inventor: Kazuya Nobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 14/011,112

(22) Filed: Aug. 27, 2013

(65) Prior Publication Data

US 2014/0063234 A1 Mar. 6, 2014

(30) Foreign Application Priority Data

Aug. 31, 2012 (JP) .................................. 2012-191346

(51) Int. Cl.
*H04N 7/18* (2006.01)
*G02B 7/34* (2006.01)

(52) U.S. Cl.
CPC ................ *H04N 7/18* (2013.01); *G02B 7/346* (2013.01)

(58) Field of Classification Search
CPC ........... G02B 7/34; G02B 7/346; H04N 7/18
USPC ...................................................... 348/140
See application file for complete search history.

(56) References Cited

U.S. PATENT DOCUMENTS

| | | | |
|---|---|---|---|
| 2001/0045989 A1* | 11/2001 | Onuki | 348/345 |
| 2002/0121652 A1* | 9/2002 | Yamasaki | 257/222 |
| 2009/0295964 A1* | 12/2009 | Utagawa et al. | 348/302 |
| 2011/0181770 A1* | 7/2011 | Rapaport et al. | 348/348 |
| 2011/0317042 A1* | 12/2011 | Goto | 348/241 |
| 2012/0099006 A1* | 4/2012 | Matsuo et al. | 348/241 |
| 2012/0286137 A1* | 11/2012 | Yamaguchi | 250/208.1 |

FOREIGN PATENT DOCUMENTS

| | | |
|---|---|---|
| JP | H09-005610 A | 1/1997 |
| JP | 4403477 B2 | 2/2010 |
| JP | 2011-095027 A | 5/2011 |
| JP | 2012-145840 A | 8/2012 |
| WO | 2011/017577 A2 | 2/2011 |

* cited by examiner

*Primary Examiner* — Sath V Perungavoor
*Assistant Examiner* — Boubacar Abdou Tchoussou
(74) *Attorney, Agent, or Firm* — Fitzpatrick, Cella, Harper & Scinto

(57) ABSTRACT

The distance calculating apparatus detects an object distance to an object based on a first object image signal formed by a luminous flux passing through a first pupil region of an imaging optical system and a second object image signal formed by a luminous flux passing through a second pupil region of the imaging optical system, which are generated by using an imaging device including multiple pixels. The imaging device includes a first and a second photoelectric conversion sections. The first and the second photoelectric conversion sections generate the first and the second object image signals, respectively. The first and the second pupil regions have asymmetric pupil region shapes in an exit pupil of the imaging optical system. An object distance calculation unit detects the object distance by a DFD method based on a difference in bokeh of the first and the second object image signals.

12 Claims, 6 Drawing Sheets

DISTANCE CALCULATING APPARATUS, IMAGE PICK-UP APPARATUS USING THE SAME, DISTANCE CALCULATING METHOD, PROGRAM FOR REALIZING DISTANCE CALCULATION, AND STORAGE MEDIUM HAVING THE PROGRAM STORED THEREON

BACKGROUND OF THE INVENTION

1. Field of the Invention

The present invention relates to a distance calculating apparatus, an image pick-up apparatus using the same, a distance calculating method, a program for realizing distance calculation, and a storage medium having the program stored thereon, and more particularly, to a distance calculating apparatus for use, for example, in an image pick-up apparatus such as a digital camera or a digital video camera, and the like.

2. Description of the Related Art

Regarding a digital camera or a digital video camera, there has been proposed a depth-from-defocus (DFD) method capable of acquiring a distance to an object to be photographed (Japanese Patent No. 4403477). In the DFD method, imaging is performed twice with different imaging conditions (for example, aperture value and focal length) of an imaging lens mounted in the digital camera or the like to acquire two images having different bokeh depending on object distances. Then, after calculating a correlation value between the images for each pixel, the object distance, which is the distance to the object, may be calculated for each pixel by referring to a look-up table, which defines a relationship between a correlation amount of the bokeh and the object distance.

In the DFD method, the images and the object distance (hereinafter also referred to as object distance information) of each pixel may be acquired. An amount of bokeh of the object in the images depends on the object distance. By processing the acquired images based on the object distance information, image processing such as bokeh rendering, refocusing (processing of focusing on an arbitrary position), or the like may be performed appropriately on the photographed images.

In order to appropriately perform the image processing based on the object distance, it is desired to calculate the object distance with high accuracy. In the DFD method, the imaging needs to be performed twice with the different imaging conditions to acquire the two images. Therefore, for a moving object, the same object is located at different angles of field between the images, and hence there are cases where the correlation value between the images cannot be calculated with high accuracy. Also in a case where a moving speed of the object changes between the images, the amount of blur of the object is different between the images, and hence there are cases where the correlation value between the images cannot be calculated with high accuracy. As a result, depending on the object, there are cases where the object distance cannot be calculated with high accuracy. In this manner, in a distance calculating apparatus using the conventional DFD method, the imaging needs to be performed multiple times to acquire the object distance, and hence depending on the object, there have been cases where the object distance is calculated incorrectly.

SUMMARY OF THE INVENTION

In view of the above-mentioned problem, a distance calculating apparatus according to one embodiment of the present invention includes an object distance calculation unit for detecting an object distance to an object based on a first object image signal formed by a luminous flux that has passed through a first pupil region of an imaging optical system and a second object image signal formed by a luminous flux that has passed through a second pupil region of the imaging optical system, which are generated by using an imaging unit including multiple pixels. The first pupil region and the second pupil region have asymmetric pupil region shapes in an exit pupil of the imaging optical system. The object distance calculation unit detects the object distance by a DFD method based on a difference in bokeh of the first object image signal and the second object image signal.

Further features of the present invention will become apparent from the following description of exemplary embodiments with reference to the attached drawings.

According to the present invention, the distance calculating apparatus capable of calculating the object distance with high accuracy irrespective of the object, an image pick-up apparatus using the distance calculating apparatus, a distance calculating method, and the like may be realized.

DESCRIPTION OF THE EMBODIMENTS

Figure 1A:
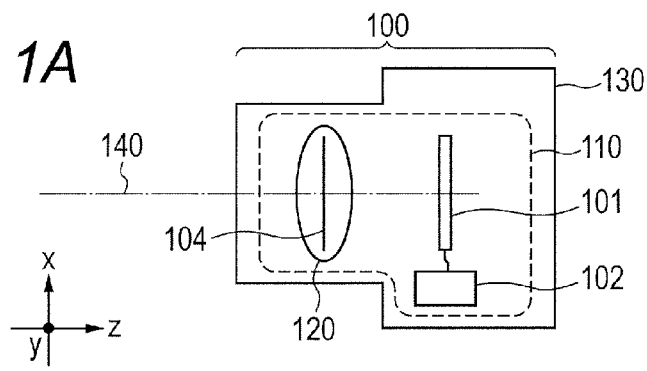
FIGS. 1A and 1B are diagrams explaining a digital camera including a distance calculating apparatus according to the present invention.

Features of the present invention include the following. A distance to an object is detected based on a first object image signal formed by a luminous flux that has passed through a first pupil region of an imaging optical system and a second object image signal formed by a luminous flux that has passed through a second pupil region of the imaging optical system, which are generated using an imaging device including an array of multiple pixels. For the purpose of detecting the distance to the object, an object distance calculation unit is provided, and the imaging device includes a first photoelectric conversion section for generating the first object image signal and a second photoelectric conversion section for generating the second object image signal. Moreover, the apparatus is configured so that the first pupil region and the second pupil region have asymmetric pupil region shapes within an exit pupil of the imaging optical system. The asymmetric pupil region shapes mean shapes that never completely overlap even when the first pupil region and the second pupil region are moved relatively to be superimposed. Whether the shapes are asymmetric or not is determined here considering not only just the outer shapes but also pupil sensitivity distributions of the pupil regions obtained by projecting pixel sensitivities, which are determined by sensitivities of the photoelectric conversion sections and the like, on the exit pupil. As a result, two images formed by the first and second object image signals, which are obtained at the same time, have different bokeh depending on the object distance. Therefore, without performing imaging multiple times with different imaging conditions, the object distance calculation unit may detect the object distance by a DFD method based on a difference of the bokeh.

Now referring to the drawings, a distance calculating apparatus, an image pick-up apparatus using the same, a distance calculating method, and the like according to embodiments of the present invention are described. In the following description, a digital camera is used for description as an example of the image pick-up apparatus including the distance calculating apparatus according to the present invention, but the application of the present invention is not limited thereto. For example, the present invention may also be applied to the image pick-up apparatus such as a digital video camera or a live view camera, a digital distance meter, or the like. Note that, in the description referring to the drawings, parts representing the same parts are denoted in principle by the same reference symbols throughout the drawings, and a duplicate description is omitted where possible.

First Embodiment

A description is given of a digital camera including a distance calculating apparatus according to a first embodiment of the present invention.

Configuration of the Digital Camera

FIG. 1A illustrates a digital camera 100 including the distance calculating apparatus according to this embodiment. The digital camera 100 includes an imaging optical system 120, an imaging device 101, an object distance calculation unit 102, an image generation unit (not shown), which are arranged inside a photographing housing 130 of the camera. In this embodiment, a distance calculating apparatus 110 may include the imaging optical system 120, the imaging device 101, and the object distance calculation unit 102. The object distance calculation unit 102 may be constructed by using a logical circuit. As another embodiment, the object distance calculation unit 102 may include a central processing unit (CPU) and a memory for storing an arithmetic processing program.

The imaging optical system 120 is an imaging lens of the digital camera 100 and has a function of forming an image of the object on the imaging device 101, which is an imaging surface. The imaging optical system 120 includes multiple lens units (not shown), a stop (not shown), and an exit pupil 104 which is located a predetermined distance away from the imaging device 101. In FIG. 1A, an optical axis 140 of the imaging optical system 120 is illustrated, and the optical axis is parallel to a z axis herein. Further, an x axis and a y axis are perpendicular to each other and are axes perpendicular to the optical axis.

Configuration of the Imaging Device

The imaging device 101 is constructed of a complementary metal-oxide semiconductor (CMOS) or a charge-coupled device (CCD). The object image formed on the imaging device 101 via the imaging optical system 120 is photoelectrically converted into an electric signal by the imaging device 101. Now, the imaging device 101 according to this embodiment is described in more detail with reference to FIG. 1B.

Figure 1B:
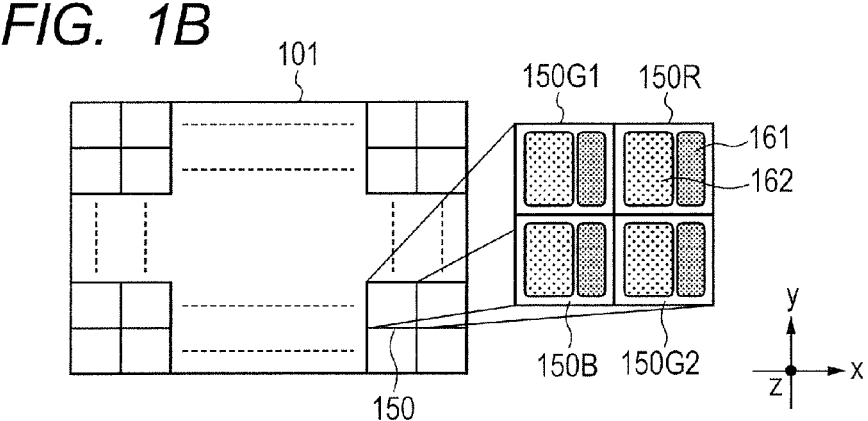

FIG. 1B is an xy cross-sectional view of the imaging device 101. The imaging device 101 includes multiple pixel groups 150 each having 2×2 pixels, arranged in matrix. The pixel group 150 includes green pixels 150G1 and 150G2 arranged in a diagonal direction, and a red pixel 150R and a blue pixel 150B arranged as two pixels in the other diagonal direction. Further, in each of the pixels constituting the pixel group 150, a light receiving layer 203 (in FIG. 2) in the pixel includes two photoelectric conversion sections (photoelectric conversion section 161 and photoelectric conversion section 162) having asymmetric cross-sectional shapes in an xy cross section arranged side by side. In this embodiment, the photoelectric conversion section 161 and the photoelectric conversion section 162 have rectangular shapes having mutually different sizes in order to be asymmetric in the xy cross-sectional shapes. More specifically, the pixel includes a microlens 202 (in FIG. 2) and the light receiving layer, the light receiving layer includes the first photoelectric conversion section 161 and the second photoelectric conversion section 162, and the first photoelectric conversion section and the second photoelectric conversion section have asymmetric cross-sectional shapes in a cross section perpendicular to the optical axis of the imaging optical system 120.

Description of Principle of Distance Measurement

Figure 2:
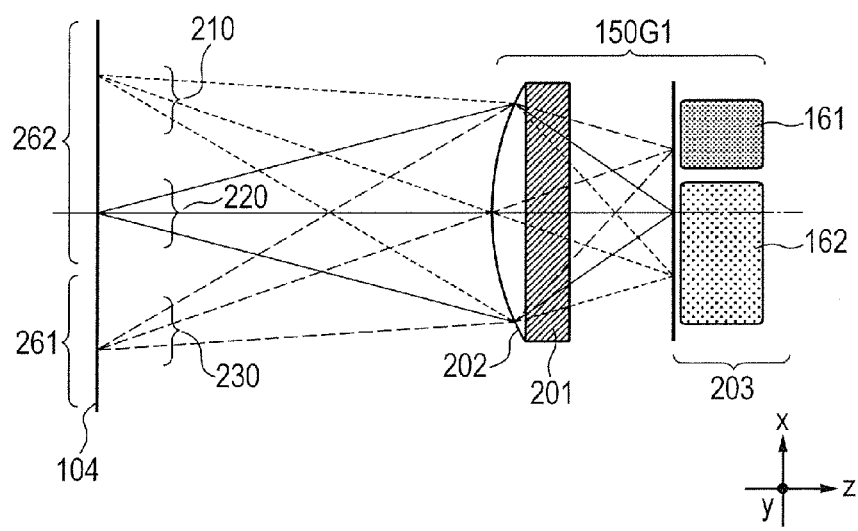
FIG. 2 illustrates incident luminous fluxes on a pixel.

A description is given of luminous fluxes that enter the pixels arranged in the imaging device 101 with reference to FIG. 2. FIG. 2 is a schematic diagram illustrating the exit pupil 104 of the imaging optical system 120 and only the green pixel 150G1 as a representative example of the pixels arranged in the imaging device 101. In the green pixel 150G1, the photoelectric conversion section 161 and the photoelectric conversion section 162 having different xy cross-sectional areas are arranged side by side. Further, in the green pixel 150G1, a color filter 201 is arranged between a light receiving layer 203 and a microlens 202. As illustrated in FIG. 2, a luminous flux 220 that has passed through a center (more generally, a center of gravity, but also referred to as center herein) of the exit pupil 104 and a luminous flux 210 that has passed through a periphery thereof enter the photoelectric conversion section 162. On the other hand, a luminous flux 230 that has passed through the periphery of the exit pupil 104 enters the photoelectric conversion section 161. In other words, a luminous flux that has passed through a pupil region 261 in the exit pupil 104 and a luminous flux that has passed through a pupil region 262 enter the photoelectric conversion section 161 and the photoelectric conversion section 162, respectively. The photoelectric conversion section 161 and the photoelectric conversion section 162 photoelectrically convert the received luminous fluxes to generate the first object image signal (signal generated by the photoelectric conversion section 161) and the second object image signal (signal generated by the photoelectric conversion section 162), respectively. The first object image signal and the second object image signal are signals generated when the luminous fluxes that have passed through the pupil region 261 and the pupil region 262, which have asymmetric pupil region shapes because the xy cross-sectional shapes of the photoelectric conversion section 161 and the photoelectric conversion section 162 are asymmetric, are received by the photoelectric conversion sections.

Figure 3A:
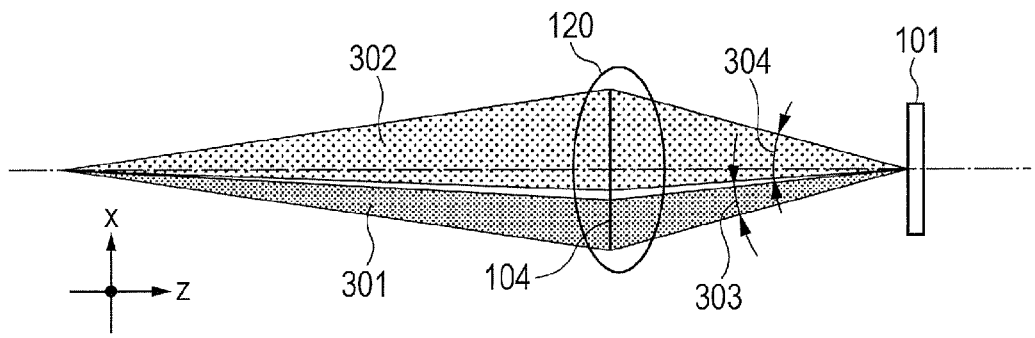
FIGS. 3A and 3B are diagrams explaining amounts of bokeh of the incident luminous fluxes.

FIG. 3A illustrates a luminous flux 301 that enters the photoelectric conversion section 161 and a luminous flux 302 that enters the photoelectric conversion section 162. In this embodiment, as illustrated in FIG. 1B, the photoelectric conversion section 162, which is arranged side by side with the photoelectric conversion section 161 in the pixel of the pixel group 150, has an xy cross-sectional area that is larger than that of the photoelectric conversion section 161. Therefore, an incident angle range 304 of the luminous flux 302 received by the photoelectric conversion section 162 is larger than an incident angle range 303 of the luminous flux 301 received by the photoelectric conversion section 161. This is equivalent to the fact that the luminous flux 302 received by the photoelectric conversion section 162 has a smaller F-number than that of the luminous flux 301 received by the photoelectric conversion section 161.

Figure 3B:
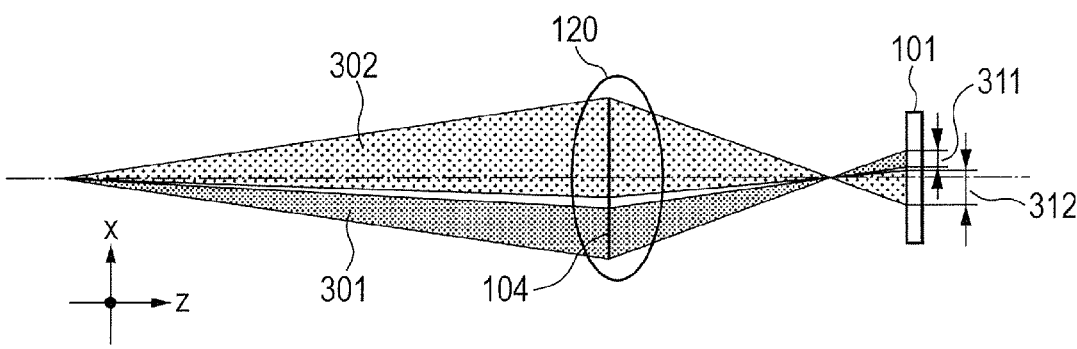

FIG. 3B illustrates a defocus state as opposed to FIG. 3A. In FIG. 3B, a width 311 represents an amount of bokeh of the luminous flux 301, and a width 312 represents an amount of bokeh of the luminous flux 302. The luminous flux 302 received by the photoelectric conversion section 162 has the smaller F-number than that of the luminous flux 301 received by the photoelectric conversion section 161, and hence when defocused, the amount of bokeh 312 of the luminous flux 302 is larger than the amount of bokeh 311 of the luminous flux 301. An amount of defocus corresponds to the object distance, and hence the amount of bokeh of the luminous flux 302 greatly depends on the object distance. On the other hand, the amount of bokeh of the luminous flux 301 has a lower dependency on the object distance than that of the luminous flux 302. As a result, a correlation value between the first object image signal generated based on the luminous flux 301 and the second object image signal generated based on the luminous flux 302 is large near an in-focus state, and becomes smaller when more defocused.

Figure 4:
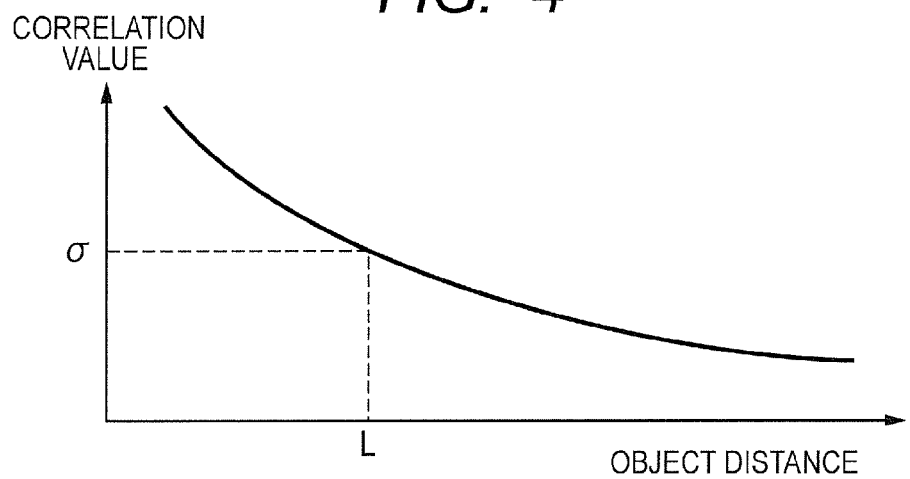
FIG. 4 is a graph showing a relationship between an object distance and a correlation value.

FIG. 4 is a graph showing a relationship between the correlation value and the object distance, with the object distance on the abscissa and the correlation value on the ordinate. In the distance calculating apparatus 110 of the digital camera 100, the first object image signal generated by the photoelectric conversion section 161 and the second object image signal generated by the photoelectric conversion section 162 are transmitted to the object distance calculation unit 102. The object distance calculation unit 102 may calculate an object distance L by calculating a correlation value a and then referring to a look-up table showing the relationship between the correlation value and the object distance as in FIG. 4.

Distance Calculation Flow

Figure 5:
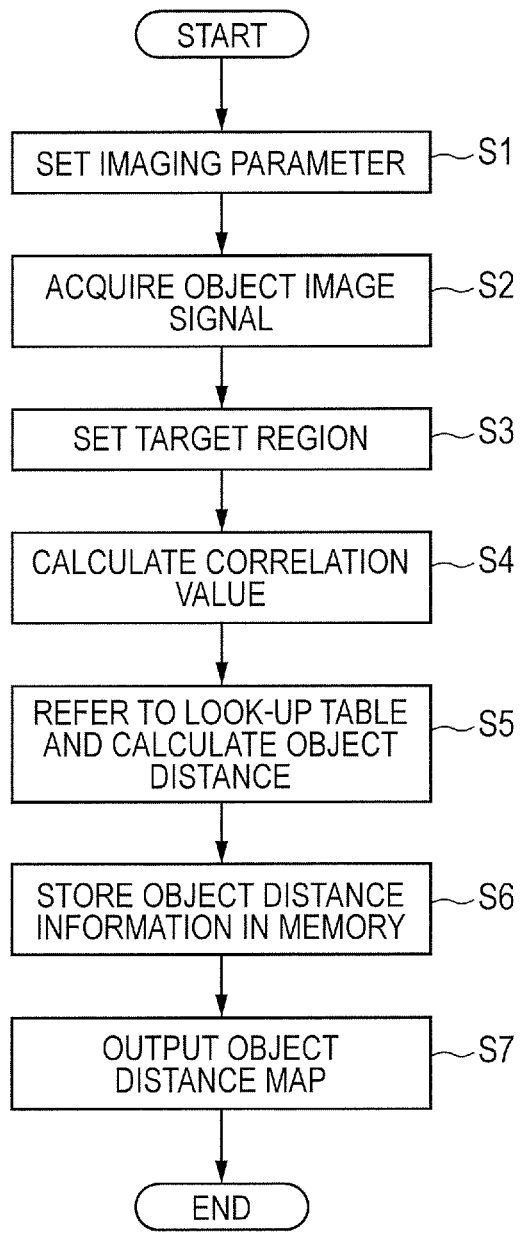
FIG. 5 is a flowchart illustrating a distance calculation procedure.

Now referring to FIG. 5, a description is given in more detail of a procedure of calculating the object distance. In Step S1, imaging parameters (aperture value, focal length, and the like) are set with functions of the digital camera 100. In Step S2, the imaging device 101 acquires the first object image signal and the second object image signal to be transmitted to the object distance calculation unit 102. At this time, when the imaging device 101 has N×M pixels, image signals having N×M data points are transmitted to the object distance calculation unit 102. In Step S3, a range of pixels used for calculating the correlation value is set as a target region (distance measuring range). The target region in an x direction is set to a range of xmin to xmax, and the target region in a y direction is set to a range of ymin to ymax. In other words, the object distance calculation unit 102 includes a target region setting section for setting a first target region for the first object image signal and setting a second target region for the second object image signal, which has the same region size as the first target region, at a position corresponding to the first target region.

In Step S4, the first object image signal and the second object image signal in regions included in the target regions are extracted to calculate the correlation value between the signals. The extracted first object image signal is referred to as a first partial object image signal, and the extracted second object image signal is referred to as a second partial object image signal. The correlation value may be calculated by using a known method, and may be calculated based on, for example, Equation 1 below. In Equation 1, f1 is the first partial object image signal, f2 is the second partial object image signal, f1bar is an arithmetic mean value of the first partial object image signal, and f2 bar is an arithmetic mean value of the second partial object image signal. σ1 is a standard deviation of the first partial object image signal, and σ2 is a standard deviation of the second partial object image signal. For this purpose, the object distance calculation unit 102 includes a partial signal extraction section for extracting the first partial object image signal from the first target region and extracting the second partial object image signal from the second target region. The object distance calculation unit 102 further includes a correlation value calculation section for calculating the correlation value between the first partial object image signal and the second partial object image signal.

$$\sigma = \sum_{x=xmin}^{xmax} \sum_{y=ymin}^{ymax} \frac{\{(f_1(x, y) - f_{1bar}(x, y)) \cdot (f_2(x, y) - f_{2bar}(x, y))\}}{\sigma_1 \sigma_2}$$

Equation 1

In this embodiment, the correlation value is calculated based on Equation 1, but the correlation value may be calculated by Fourier transforming the first partial object image signal and the second partial object image signal within the target regions to take a ratio thereof. In Step S5, based on the imaging parameters in Step S1, a look-up table defining a relationship between the correlation value and the object distance is selected. Further, the object distance corresponding to the correlation value σ, which is calculated in Step S4, is calculated. In other words, the object distance calculation unit 102 includes an object distance calculation section for calculating the object distance by referring to the look-up table, which shows the relationship between the correlation value and the object distance. Alternatively, the object distance may be calculated by approximating by a function the relationship between the correlation value and the object distance shown in FIG. 4, storing coefficients of the function in a memory unit (not shown), and substituting the correlation value calculated in Step S4 into the function. As the function, a fractional function may be used, for example. In Step S6, the object distance calculated in Step S5 is stored in a memory unit (not shown in FIG. 1A) included in the distance calculating apparatus 110. After performing the processing of Steps S3 to S6 on all the pixels in the imaging device 101, in Step S7, object distance information is stored in a memory unit (not shown) of the digital camera 100.

Through the processing of Steps S1 to S7 described above, the object distance information (such as object distance map) may be calculated in the distance calculating apparatus 110 according to this embodiment. On the other hand, an image may be generated by calculating a sum signal of the first object image signal and the second object image signal by the image generation unit (not shown).

In the digital camera 100 according to this embodiment, each of the pixels constituting the imaging device 101 includes the two photoelectric conversion sections having shape asymmetry, and the luminous fluxes that have passed through different regions of the exit pupil 104 are received by the photoelectric conversion sections, respectively. Then, the fact that the bokeh of the object image signals formed by the luminous fluxes received by the two photoelectric conversion sections have mutually different dependencies on the object distance may be used to calculate the object distance. Further, the object image signals generated by the photoelectric conversion sections may be used to generate the image at the same time. The digital camera 100 according to this embodiment may generate the object distance information and the image at the same time by performing the imaging once, and hence the object distance may be calculated with high accuracy even for a moving object. Also in a case where a moving speed of the object changes irregularly, the object distance information and the image may be acquired by performing the imaging once, and hence the amounts of blur of the object become substantially equal between the first object image signal and the second object image signal, with the result that the object distance information may be calculated with high accuracy.

In Step S3 of the procedure of FIG. 5, the first partial object image signal is extracted from the first object image signal, and the second partial object image signal is extracted from the second object image signal. However, a third object image signal may be generated by adding the first object image signal and the second object image signal to extract the second partial object image signal from the third object image signal. The luminous fluxes on which the third object image signal obtained by adding the two image signals is based are the luminous fluxes that have passed through substantially the entire region of the exit pupil 104, and hence the third object image signal is an object image signal having a larger amount of light than those of the first object image signal and the second object image signal. Therefore, effects of noise added by the imaging device 101 may be reduced, with the result that the object distance may be calculated with high accuracy even in a case where an illuminance of the object is low. In this case, the object distance calculation unit 102 further includes an image signal adding section for generating the third object image signal, which is obtained by adding the second object image signal to the first object image signal, and the target region setting section sets the second target region for the third object image signal.

Further, in Step S2 of the procedure of FIG. 5, in acquiring the first and second object image signals from the imaging device 101, in this embodiment, the first object image signal is generated as an output from the photoelectric conversion section 161, and the second object image signal is generated as an output from the photoelectric conversion section 162. However, in reading charges from a charge storage unit (not shown) arranged in the vicinity of the photoelectric conversion section 162, the second object image signal may be generated without resetting the charges in the photoelectric conversion section 162, and the charges in the photoelectric conversion section 161 and the photoelectric conversion section 162 may be combined and read to generate the third object image signal. In other words, the third object image signal is an image signal generated based on the luminous fluxes received respectively by the photoelectric conversion section 161 and the photoelectric conversion section 162, and the second object image signal is an image signal generated based on the luminous flux received by the photoelectric conversion section 162. In this case, an object distance calculation procedure further including, prior to Step S3 in the procedure of FIG. 5, a step of calculating a differential signal of the third object image signal and the second object image signal and setting the calculated differential signal as the first object image signal is used. On the other hand, the image may be generated by a known method based on the third object image signal.

In this embodiment, the object distance is calculated based on the procedure of FIG. 5, but before performing Step S4 of calculating the correlation value, a high-pass filter may be applied to the first object image signal and the second object image signal. In a digital still camera in which the imaging device 101 has a small size, a depth of field is deep, and hence it is difficult to obtain a large difference of the correlation values. When the high-pass filter is applied, the dependency of the correlation value on the object distance may be increased, and hence the object distance may be calculated at higher accuracy. As the high-pass filter, a gradient filter, which is a first derivative filter, or a Laplacian filter, which is a second derivative filter, may be used.

The imaging device 101 according to this embodiment is configured so that in each of the green pixels, the red pixel, and the blue pixel, the two photoelectric conversion sections (photoelectric conversion section 161 and photoelectric conversion section 162) are arranged side by side. However, for example, the two photoelectric conversion sections may be arranged only in the green pixels 150G1 and 150G2 (in FIG. 1B), and the other red and blue pixels may have the same configuration as the conventional pixel for acquiring the image, which includes only one photoelectric conversion section. The two photoelectric conversion sections are arranged only in the green pixels, and hence the time for reading the object image signals and the processing time required for calculating the object distance may be reduced. In the case where the two photoelectric conversion sections are arranged only in the green pixels, the object distance is calculated by using the first object image signal and the second object image signal, which are output from the green pixels.

Figure 6A:
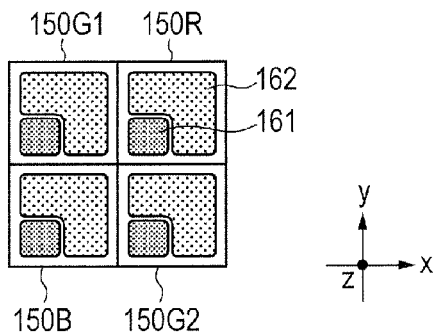
FIGS. 6A, 6B, and 6C illustrate other embodiments of photoelectric conversion sections according to a first embodiment of the present invention.
Figure 6B:
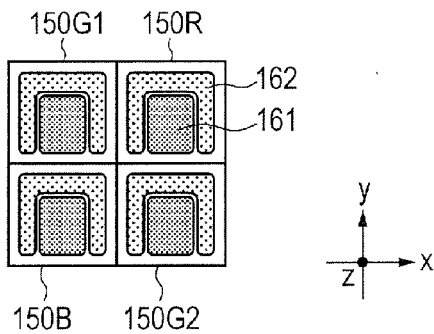
Figure 6C:
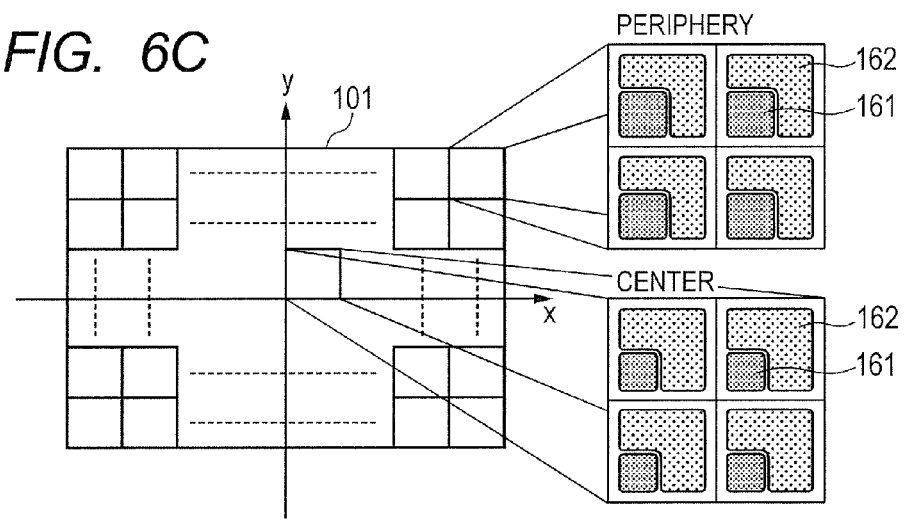

The photoelectric conversion section 161 and the photoelectric conversion section 162 included in the imaging device 101 constituting the distance calculating apparatus 110 have rectangular cross-sectional shapes as illustrated in FIG. 1B, but may have any shape as long as the correlation value between the first object image signal and the second object image signal takes a different value depending on the object distance. For example, as illustrated in FIG. 6A, the photoelectric conversion section 162 may have an L shape and the photoelectric conversion section 161 may have a rectangular shape. Alternatively, as illustrated in FIG. 6B, the photoelectric conversion section 162 may have a U shape and the photoelectric conversion section 161 may have a rectangular shape so that the photoelectric conversion sections have equal xy cross-sectional areas. The photoelectric conversion section 161 and the photoelectric conversion section 162 of FIG. 6B have the substantially equal xy cross-sectional areas, but because the imaging optical system 120 has a wavefront aberration and because the luminous flux 301 and the luminous flux 302 have the different incident angle ranges, the correlation value takes a different value depending on the object distance. FIG. 6C illustrates, as with FIG. 1B, the configuration of the imaging device 101. Taking vignetting of the imaging optical system 120 and a fact that a principal ray angle is increased in a peripheral region of the imaging device 101 into consideration, as illustrated in FIG. 6C, the xy cross-sectional areas of the photoelectric conversion section 161 and the photoelectric conversion section 162 may be changed for an region in the vicinity of a center of the imaging device 101, which is near an intersection with the optical axis 140, and for the peripheral region of the imaging device 101. When the xy cross-sectional areas of the photoelectric conversion section 161 and the photoelectric conversion section 162 are changed for the center and the periphery of the imaging device 101 depending on an image height in the imaging device 101, the following effects may be obtained. To be specific, a change in light amount ratio of the first object image signal and the second object image signal in the peripheral region, which is caused by the vignetting of the imaging optical system 120 and the increased principal ray angle, may be reduced, and the object distance may be calculated with high accuracy over the entire region of the imaging device 101.

Figure 8:
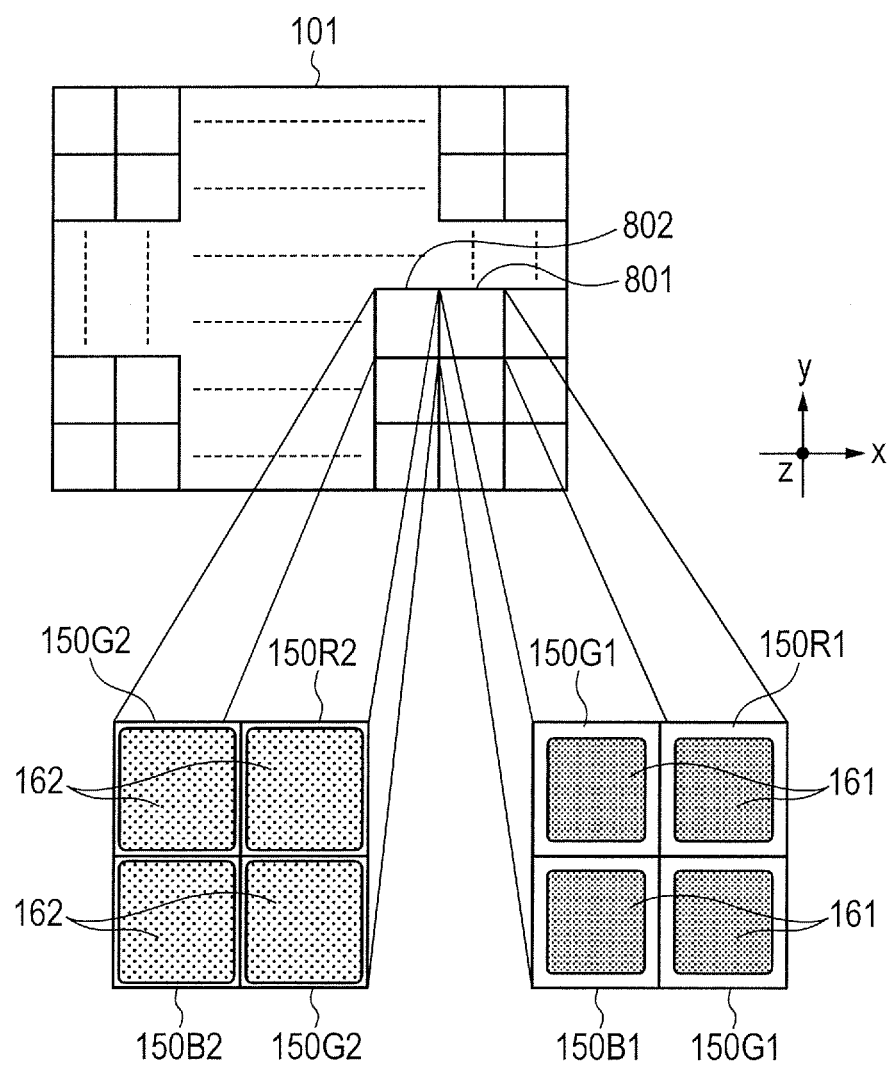
FIG. 8 illustrates another embodiment of an imaging device according to the first embodiment of the present invention.

The imaging device 101 according to this embodiment includes the two photoelectric conversion sections 161 and 162 in each pixel, but may include one photoelectric conversion section in each pixel. FIG. 8 is an xy cross-sectional view of the imaging device 101. The imaging device 101 includes pixel groups 801 including only the photoelectric conversion section 161 in each pixel and pixel groups 802 including only the photoelectric conversion section 162 in each pixel, which are arranged in a staggered grid pattern. The pixel group 801 includes 2×2 pixels arranged in matrix, in which the green pixels 150G1 are arranged in a diagonal direction and a red pixel 150R1 and a blue pixel 150B1 are arranged as the other pixels. On the other hand, the pixel group 802 includes 2×2 pixels arranged in matrix, in which the green pixels 150G2 are arranged in a diagonal direction and a red pixel 150R2 and a blue pixel 150B2 are arranged as the other pixels. The photoelectric conversion section 161 included in each pixel of the pixel group 801 and the photoelectric conversion section 162 included in each pixel of the pixel group 802 have different xy cross-sectional areas. The photoelectric conversion section 161 photoelectrically converts the received luminous flux to generate the first object image signal, and the photoelectric conversion section 162 photoelectrically converts the received luminous flux to generate the second object image signal. In other words, the imaging device includes first pixels each including the first photoelectric conversion section 161 and second pixels each including the second photoelectric conversion section 162, and the first photoelectric conversion section of the first pixel and the second photoelectric conversion section of the second pixel have asymmetric shapes in a cross section perpendicular to the optical axis of the imaging optical system. Due to the fact that the photoelectric conversion section 161 and the photoelectric conversion section 162 have different xy cross-sectional areas, the correlation value between the first object image signal and the second object image signal changes depending on the object distance. Therefore, the object distance information may be calculated according to the distance calculation procedure described with reference to FIG. 5. The photoelectric conversion section 161 has a smaller xy cross-sectional area than that of the photoelectric conversion section 162, and hence the first object image signal has lower signal strength than that of the second object image signal. Therefore, in order to generate an image, the signal strengths of the first object image signal and the second object image signal need to be corrected by multiplying the first object image signal by a gain value, which is calculated based on a ratio of the xy cross-sectional areas of the photoelectric conversion section 161 and the photoelectric conversion section 162.

Second Embodiment

Next, a second embodiment of the present invention that is different from the first embodiment in terms of the configuration of the imaging device 101 is described in detail with reference to the drawings. In the following description, as in the first embodiment, a digital camera is used for description as an example of an image pick-up apparatus including a distance calculating apparatus according to this embodiment, but the application of the present invention is not limited thereto. For example, the present invention may be applied to a digital video camera, a digital distance meter, or the like.

Configuration of the Imaging Device and Principle of Distance Measurement

Figure 7A:
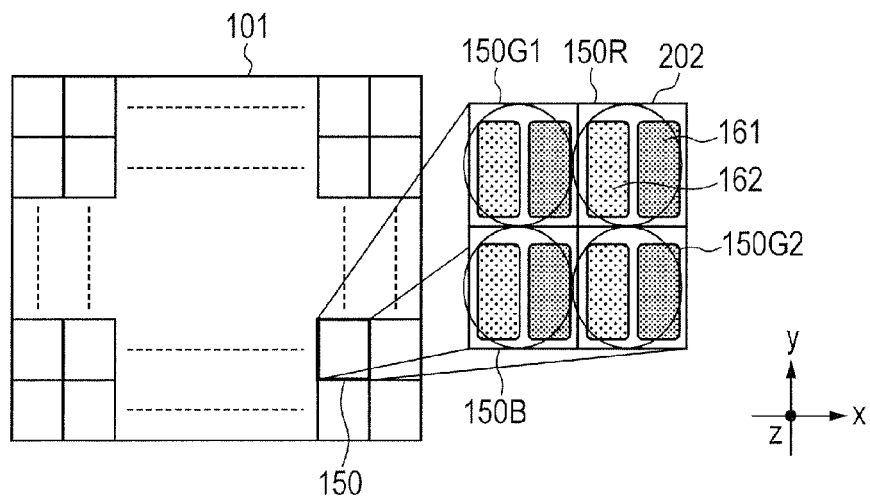
FIGS. 7A and 7B are diagrams explaining an imaging device according to a second embodiment of the present invention.

FIG. 7A is an xy plan view of the imaging device 101. The imaging device 101 includes multiple pixel groups 150 each having 2×2 pixels, arranged in matrix. The pixel group 150 includes green pixels 150G1 and 150G2 arranged in a diagonal direction, and a red pixel 150R and a blue pixel 150B arranged as two pixels in the other diagonal direction. Further, in each of the pixels constituting the pixel group 150, a light receiving layer 203 (in FIG. 7B) in the pixel includes two photoelectric conversion sections (photoelectric conversion section 161 and photoelectric conversion section 162) having the same cross-sectional area in an xy cross section arranged side by side. Further, in the pixel group 150, microlenses 202 are arranged. In each pixel of the pixel groups 150 arranged on a +x side of the optical axis 140 of the imaging optical system 120, the microlens 202 is arranged eccentrically to a −x direction with respect to the center of the pixel. On the other hand, in each pixel of the pixel groups 150 arranged on a −x side of the optical axis 140 of the imaging optical system 120, the microlens 202 is arranged eccentrically to a +x direction with respect to the center of the pixel. In other words, the multiple pixels constituting the imaging device each include the microlens and the light receiving layer, the light receiving layer includes the first photoelectric conversion section 161 and the second photoelectric conversion section 162, and the first photoelectric conversion section 161 and the second photoelectric conversion section 162 have substantially the same shape in a cross section perpendicular to the optical axis of the imaging optical system. The microlens is eccentric with respect to the center of the pixel so that a straight line connecting a position at a surface of the light receiving layer and at the center of the pixel and a vertex of the microlens and a straight line connecting the center of gravity of the exit pupil of the imaging optical system and the vertex of the microlens do not become parallel.

Figure 7B:
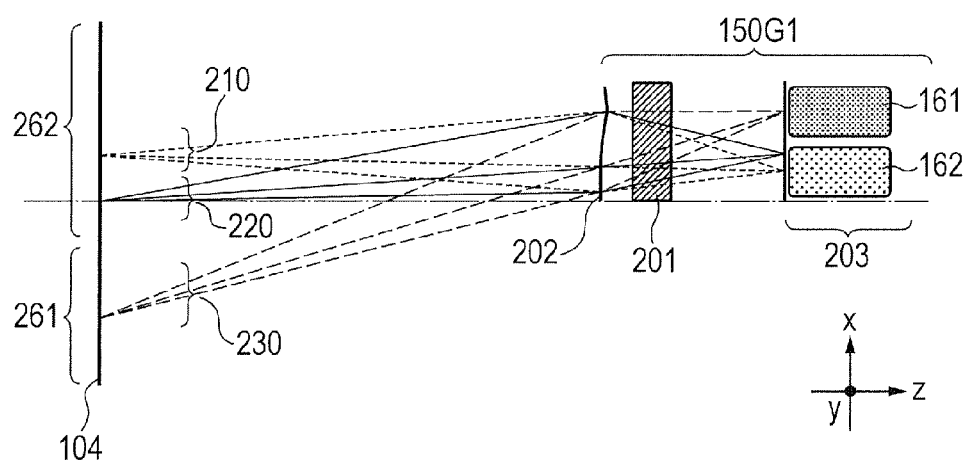

A description is given of luminous fluxes that enter the pixels arranged in the imaging device 101 with reference to FIG. 7B. FIG. 7B is an xz cross-sectional schematic view illustrating the exit pupil 104 and only the green pixel 150G1 as a representative example of the pixels arranged in the imaging device 101 on the +x side of the optical axis 140. In the green pixel 150G1 illustrated in FIG. 7B, the photoelectric conversion section 161 and the photoelectric conversion section 162 having the same xy cross-sectional area are arranged side by side. Further, the microlens 202 is arranged eccentrically to the −x direction with respect to the center of the green pixel 150G1. As illustrated in FIG. 7B, the microlens 202 is arranged eccentrically, and hence the luminous flux 210 that has passed through a peripheral region on the +x side of the exit pupil 104 and the luminous flux 220 that has passed through the center region enter the photoelectric conversion section 162. On the other hand, the luminous flux 230 that has passed through a peripheral region on the −x side of the exit pupil 104 enters the photoelectric conversion section 161. In other words, a luminous flux that has passed through the pupil region 261 in the exit pupil 104 and a luminous flux that has passed through the pupil region 262 enter the photoelectric conversion section 161 and the photoelectric conversion section 162, respectively. The photoelectric conversion section 161 and the photoelectric conversion section 162 photoelectrically convert the received luminous fluxes to generate a first object image signal (signal generated by the photoelectric conversion section 161) and a second object image signal (signal generated by the photoelectric conversion section 162), respectively. The first object image signal and the second object image signal are signals generated when the luminous fluxes that have passed through the pupil region 261 and the pupil region 262, which have different areas because the microlens 202 is arranged eccentrically, are received by the two photoelectric conversion sections, respectively.

The pupil regions 261 and 262 in the exit pupil 104 through which the luminous fluxes for generating the first and second object image signals respectively pass have shapes having different areas in an xy plane because each of the microlenses 202 in the imaging device 101 is eccentric. Therefore, as described above with reference to FIG. 3A, an angle range in which the luminous flux for generating the first object image signal enters the photoelectric conversion section 161 and an angle range in which the luminous flux for generating the second object image signal enters the photoelectric conversion section 162 are different angle ranges. In other words, the luminous flux for generating the second object image signal has a smaller F-number than that of the luminous flux for generating the first object image signal. With the different F-numbers, the correlation value between the first object image signal and the second object image signal has an object distance dependency. Therefore, the object distance may be calculated by calculating the correlation value between the first object image signal and the second object image signal and referring to the look-up table defining the relationship between the correlation value and the object distance.

To be more specific, the object distance calculation procedure of FIG. 5 may be used to calculate the object distance information. Further, the object image signal obtained by taking the sum of the first object image signal and the second object image signal may be used to generate an image.

Other Embodiments

The present invention may also be attained by the following embodiments. Specifically, a storage or recording medium (e.g., non-transitory computer-readable storage medium) having stored thereon program code of software for realizing the functions of the embodiments described above (functions of the object distance calculation unit and the like) is supplied to the distance calculating apparatus. Then, a computer (or CPU, MPU, or the like) of the calculation unit reads the program code stored in the storage medium to execute the above-mentioned functions. In this case, the program code read from the storage medium realizes the functions of the embodiments described above, and the program and the storage medium having the program stored thereon may constitute the present invention.

Further, through execution of the program code read by the computer, an operating system (OS) or the like operating on the computer performs a part or all of the actual processing based on instructions of the program code. A case where the functions of the embodiments described above are realized by the processing is also encompassed by the present invention. Further, the program code read from the storage medium may be written in a memory included in a function expansion card, which is inserted in the computer, or a function expansion unit, which is connected to the computer. A case where, after the writing, a CPU or the like included in the function expansion card or the function expansion unit performs a part or all of the actual processing based on the instructions of the program code, and the functions of the embodiments described above are realized by the processing is also encompassed by the present invention. When the present invention is applied to the above-mentioned storage medium, the storage medium stores program code corresponding to the flowchart described above.

Considering the application of the present invention to the digital camera or the like, the present invention may be understood as an apparatus that is used more suitably in so-called imaging-surface distance measurement apparatus in which an imaging unit for picking up the object image is also used for detecting the distance, than in the distance calculating apparatus (for use in a single-lens reflex camera or the like) specialized in detecting the distance independent of the imaging unit. As described above, the calculation unit of the distance calculating apparatus according to the present invention may be constructed by using an integrated circuit in which semiconductor elements are integrated, and may be constituted of an IC, an LSI, a system LSI, a microprocessing unit (MPU), a central processing unit (CPU), or the like. When the calculation unit is constituted of the microprocessing unit (MPU), the central processing unit (CPU), or the like, the calculation unit may be understood as a computer. The program according to the present invention may be installed in a computer of the image pick-up apparatus including a predetermined imaging optical system, a predetermined imaging unit, and the computer to enable the image pick-up apparatus to detect the distance with high accuracy. The computer may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The distance detected by the present invention may be used to generate a distance distribution (distance map) corresponding to the image obtained by the image pick-up apparatus. Further, the amount of bokeh of the object in the image depends on the amount of defocus, and hence by subjecting the obtained image to processing based on the distance distribution, image processing such as bokeh rendering, refocusing after the imaging, or the like may be performed appropriately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-191346, filed on Aug. 31, 2012, which is hereby incorporated by reference herein in its entirety.

What is claimed is:

1. A distance calculating apparatus comprising: an object distance calculation unit configured to calculate object distance information based on a first object image signal formed by a first luminous flux that has passed through a first pupil region of an imaging optical system and a second object image signal formed by a second luminous flux that has passed through a second pupil region of the imaging optical system, which are generated by using an imaging device comprising multiple pixels,
   wherein the imaging device comprises a first photoelectric conversion section and a second photoelectric conversion section,
   wherein the first photoelectric conversion section receives the first luminous flux and generates the first object image signal, and the second photoelectric conversion section receives the second luminous flux and generates the second object image signal,
   wherein each pixel of the imaging device comprises the first photoelectric conversion section and the second photoelectric conversion section,
   wherein the first pupil region and the second pupil region have different shapes or sizes from each other in an exit pupil of the imaging optical system, and
   wherein the object distance calculation unit calculates the object distance information by a depth-from-defocus method based on a difference in bokeh of the first object image signal and the second object image signal.

2. A distance calculating apparatus according to claim 1, wherein the object distance calculation unit comprises:
   a processor functioning as:
   a target region setting section configured to set a first target region for the first object image signal and setting a second target region for the second object image signal, which has the same region size as the first target region, at a position corresponding to the first target region;
   a partial signal extraction section configured to extract a first partial object image signal from the first target region and extract a second partial object image signal from the second target region;
   a correlation value calculation section configured to calculate a correlation value between the first partial object image signal and the second partial object image signal; and
   an object distance calculation section configured to calculate the object distance information by referring to a look-up table showing a relationship between the correlation value and the object distance information.

3. A distance calculating apparatus according to claim 2, wherein the processor of the object distance calculation unit further functions as an image signal adding section configured to generate a third object image signal by adding the second object image signal to the first object image signal, and
   wherein the target region setting section sets the second target region for the third object image signal.

4. A distance calculating apparatus according to claim 1, wherein at least one of the multiple pixels comprise a microlens and a light receiving layer, wherein the light receiving layer comprises the first photoelectric conversion section and the second photoelectric conversion section, and
   wherein the first photoelectric conversion section and the second photoelectric conversion section have asymmetric cross-sectional shapes in a cross section perpendicular to an optical axis of the imaging optical system.

5. A distance calculating apparatus according to claim 1, wherein the imaging device comprises a first pixel including the first photoelectric conversion section and a second pixel including the second photoelectric conversion section, and
   wherein the first photoelectric conversion section of the first pixel and the second photoelectric conversion section of the second pixel have asymmetric cross-sectional shapes in a cross section perpendicular to an optical axis of the imaging optical system.

6. A distance calculating apparatus according to claim 1, wherein the multiple pixels of the imaging device each comprise a microlens and a light receiving layer, wherein the light receiving layer comprises the first photoelectric conversion section and the second photoelectric conversion section,
   wherein the first photoelectric conversion section and the second photoelectric conversion section have substantially the same cross-sectional shape in a cross section perpendicular to an optical axis of the imaging optical system, and
   wherein the microlens is eccentric with respect to a center of the pixel so that a straight line connecting a position at a surface of the light receiving layer and at the center of the pixel and a vertex of the microlens and a straight line connecting a center of gravity of the exit pupil of the imaging optical system and the vertex of the microlens do not become parallel.

7. A distance calculating apparatus according to claim 4, wherein the first photoelectric conversion section and the second photoelectric conversion section have rectangular cross-sectional shapes having different cross-sectional areas in the cross section perpendicular to the optical axis of the imaging optical system.

8. A distance calculating apparatus according to claim 4, wherein the first photoelectric conversion section has a rectangular cross-sectional shape in the cross section perpendicular to the optical axis of the imaging optical system, and the second photoelectric conversion section has one of a U-shaped cross-sectional shape and an L-shaped cross-sectional shape in the cross section perpendicular to the optical axis of the imaging optical system.

9. A distance calculating apparatus according to claim 1, wherein cross-sectional areas of the first photoelectric conversion section and the second photoelectric conversion section in a cross section perpendicular to an optical axis of the imaging optical system are changed for a center region of the imaging device and for a peripheral region of the imaging device.

10. An image pick-up apparatus, comprising:
    a processor functioning as:
    a distance calculating apparatus comprising an object distance calculation unit configured to calculate object distance information based on a first object image signal formed by a first luminous flux that has passed through a first pupil region of an imaging optical system and a second object image signal formed by a second luminous flux that has passed through a second pupil region of the imaging optical system, which are generated by using an imaging device comprising multiple pixels,
    wherein the imaging device comprises a first photoelectric conversion section and a second photoelectric conversion section, wherein the first photoelectric conversion section receives the first luminous flux and generates the first object image signal, and the second photoelectric conversion section receives the second luminous flux and generates the second object image signal, wherein each pixel of the imaging device comprises the first photoelectric conversion section and the second photoelectric conversion section, wherein the first pupil region and the second pupil region have different shapes or sizes from each other in an exit pupil of the imaging optical system, and wherein the object distance calculation unit calculates the object distance information by a depth-from-defocus method based on a difference in bokeh of the first object image signal and the second object image signal; and an image generation unit, the imaging optical system being arranged to form an image of an object on the imaging device, wherein the image generation unit generates the image based on at least one object image signal of the first object image signal and the second object image signal, and wherein the distance calculating apparatus and the image generation unit are contained inside a photographing housing.

11. A non-transitory computer-readable storage medium storing thereon a program for causing a computer configured to calculate object distance information based on a first object image signal formed by a first luminous flux that has passed through a first pupil region of an imaging optical system and a second object image signal formed by a second luminous flux that has passed through a second pupil region of the imaging optical system, which are generated by using an imaging unit comprising an array of multiple pixels, to execute the steps of:

acquiring the first object image signal and the second object image signal at the same time under an imaging condition in which the first pupil region and the second pupil region have different shapes or sizes from each other in an exit pupil of the imaging optical system;

calculating information on a difference in bokeh of the first object image signal and the second object image signal; and calculating the object distance information by a depth-from-defocus method based on the difference in bokeh of the first object image signal and the second object image signal, wherein the imaging unit comprises a first photoelectric conversion section and a second photoelectric conversion section, wherein the first photoelectric conversion section receives the first luminous flux and generates the first object image signal, and the second photoelectric conversion section receives the second luminous flux and generates the second object image signal, wherein each pixel of the imaging device comprises the first photoelectric conversion section and the second photoelectric conversion section.

12. A distance calculating method for calculating object distance information based on a first object image signal formed by a first luminous flux that has passed through a first pupil region of an imaging optical system and a second object image signal formed by a second luminous flux that has passed through a second pupil region of the imaging optical system, which are generated by using an imaging unit comprising an array of multiple pixels, the distance calculating method comprising:

acquiring the first object image signal and the second object image signal at the same time under an imaging condition in which the first pupil region and the second pupil region have different shapes or sizes from each other in an exit pupil of the imaging optical system;

calculating information on a difference in bokeh of the first object image signal and the second object image signal; and calculating the object distance information by a depth-from-defocus method based on the difference in bokeh of the first object image signal and the second object image signal, wherein the imaging unit comprises a first photoelectric conversion section and a second photoelectric conversion section, wherein the first photoelectric conversion section receives the first luminous flux and generates the first object image signal, and the second photoelectric conversion section receives the second luminous flux and generates the second object image signal, wherein each pixel of the imaging device comprises the first photoelectric conversion section and the second photoelectric conversion section.

* * * * *